(12) United States Patent
Jouenne et al.

(10) Patent No.: US 12,091,608 B2
(45) Date of Patent: Sep. 17, 2024

(54) COMPOSITION FOR ENHANCING INJECTIVITY OF A SUBTERRANEAN FORMATION

(71) Applicant: TotalEnergies SE, Courbevoie (FR)

(72) Inventors: Stéphane Jouenne, Bizanos (FR); Guillaume Heurteux, Morlaàs (FR); Nicolas Passade-Boupat, Idron (FR)

(73) Assignee: TotalEnergies OneTech, Courbevoie (FR)

( * ) Notice: Subject to any disclaimer, the term of this patent is extended or adjusted under 35 U.S.C. 154(b) by 66 days.

(21) Appl. No.: 17/615,283

(22) PCT Filed: Jun. 7, 2019

(86) PCT No.: PCT/IB2019/000763
§ 371 (c)(1),
(2) Date: Nov. 30, 2021

(87) PCT Pub. No.: WO2020/245622
PCT Pub. Date: Dec. 10, 2020

(65) Prior Publication Data
US 2022/0220359 A1 Jul. 14, 2022

(51) Int. Cl.
*C09K 8/524* (2006.01)
*C09K 8/588* (2006.01)
*E21B 43/20* (2006.01)

(52) U.S. Cl.
CPC .............. *C09K 8/524* (2013.01); *C09K 8/588* (2013.01); *E21B 43/20* (2013.01)

(58) Field of Classification Search
CPC ............ C09K 8/88; C09K 8/68; C09K 8/605; C09K 8/524; C09K 8/588; C08B 37/0096; Y10S 507/92; E21B 43/20
See application file for complete search history.

(56) References Cited

U.S. PATENT DOCUMENTS

| | | | | |
|---|---|---|---|---|
| 4,809,781 A | * | 3/1989 | Hoefner | C09K 8/60 166/305.1 |
| 2004/0120853 A1 | * | 6/2004 | Carpenter | C09K 8/58 166/305.1 |
| 2007/0246426 A1 | * | 10/2007 | Collins | C09K 8/528 210/651 |

(Continued)

FOREIGN PATENT DOCUMENTS

WO 2010093473 A1 8/2010
WO 2012154785 A2 11/2012

(Continued)

OTHER PUBLICATIONS

Haack et al., Tetrakishydroxymethyl Phosphonium Sulfate (THPS): A New Oilfield Biocide Providing Iron Sulfide Dissolution and Environmental Benefits, 1998, UK Corrosion '98 conference by NACE (Year: 1998).*

(Continued)

*Primary Examiner* — Angela M DiTrani Leff
(74) *Attorney, Agent, or Firm* — Hamilton, Brook, Smith & Reynolds, P.C.

(57) ABSTRACT

Use of at least one compound of formula (I): (I) $[P^+(R^1-Y-R^2)_4]zXz-$ is described for enhancing the injectivity of an injection well, wherein: Y is chosen from an oxygen atom or an NH group; $R^1$ is a linear or branched alkyl radical having from 1 to 15 carbon atoms; $R^2$ is chosen from a hydrogen atom or a linear or branched alkyl radical having from 1 to 14 carbon atoms; Xz- is a monovalent anion or a divalent anion, or a trivalent anion, or a tetravalent anion group; z is a number from 1 to 4. The compound of formula (I) is added to an aqueous medium to form an injection stream which is injected into a subterranean formation which comprises at least one polymer, via said injection well.

19 Claims, 2 Drawing Sheets

(56) References Cited

U.S. PATENT DOCUMENTS

| | | | | |
|---|---|---|---|---|
| 2009/0114247 A1* | 5/2009 | Brown | ............ | C09K 8/52 |
| | | | | 134/2 |
| 2010/0204068 A1* | 8/2010 | Kesavan | ............ | C09K 8/88 |
| | | | | 507/225 |
| 2011/0034352 A1 | 2/2011 | Lin et al. | | |
| 2012/0217012 A1* | 8/2012 | Darby | ............ | E21B 37/06 |
| | | | | 166/305.1 |
| 2012/0289436 A1* | 11/2012 | Woodward | ............ | C09K 8/035 |
| | | | | 507/119 |
| 2013/0160101 A1* | 6/2013 | Hakola | ............ | H04L 63/0823 |
| | | | | 726/7 |
| 2013/0190214 A1* | 7/2013 | Kolari | ............ | C09K 8/68 |
| | | | | 507/243 |
| 2015/0197686 A1* | 7/2015 | Mason | ............ | C09K 8/685 |
| | | | | 166/305.1 |
| 2016/0032170 A1* | 2/2016 | Li | ............ | C09K 8/584 |
| | | | | 166/305.1 |
| 2017/0002259 A1* | 1/2017 | Jones | ............ | C09K 8/035 |
| 2017/0158949 A1* | 6/2017 | Jones | ............ | C09K 8/62 |
| 2020/0087568 A1* | 3/2020 | Mahmoud | ............ | C09K 8/532 |
| 2022/0073810 A1* | 3/2022 | Sinquin | ............ | E21B 43/20 |

FOREIGN PATENT DOCUMENTS

| | | |
|---|---|---|
| WO | 2012154785 A3 | 11/2012 |
| WO | 20151074901 A1 | 7/2015 |
| WO | 2017100160 A1 | 6/2017 |

OTHER PUBLICATIONS

Notification of Transmittal of the International Search Report and Written Opinion of the International Searching Authority for PCT Application No. PCT/IB2019/000763, entitled "Composition for Enhancing Injectivity of a Subterranean Formation," mailed Jan. 31, 2020.

* cited by examiner

COMPOSITION FOR ENHANCING INJECTIVITY OF A SUBTERRANEAN FORMATION

This application is the U.S. National Stage of International Application No. PCT/IB2019/000763, filed Jun. 7, 2019, which designates the U.S., published in English. The entire teachings of the above application are incorporated herein by reference.

TECHNICAL FIELD

The present invention relates to the use of a composition comprising a phosphonium salt for enhancing the injectivity of a subterranean formation.

TECHNICAL BACKGROUND

Hydrocarbons (such as crude oil) are extracted from a subterranean formation (or reservoir) by means of one or more production wells drilled in the reservoir. Before production begins, the formation, which is a porous medium, is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, there is still a large volume of hydrocarbons left in the reservoir.

This phenomenon has led to the development of enhanced oil recovery (EOR) techniques. Many of such EOR techniques rely on the injection of a fluid into the reservoir in order to produce an additional quantity of hydrocarbons.

The fluid used can in particular be an aqueous solution ("waterflooding process"), such as brine, which is injected via one or more injection wells.

Large amounts of water can also be recovered from the production wells. This is called "produced water". The produced water can be e.g. discharged to the environment (after treatment) or reinjected into the subterranean formation via the injection wells.

A polymer can also be added to the water to increase its viscosity and to increase its sweep efficiency in recovering hydrocarbons ("polymer flooding process"). In this case, the produced water contains part of the polymer, which can thus be recovered.

However, in case of low polymer quality, and/or improper polymer dissolution and/or non-adapted polymer and/or incompatibility between the polymer and trivalent cations present in the brine such as $Fe^{3+}$ for example, the injector sandface can be impaired due to an accumulation of polymer. This may result in injectivity loss. It would therefore be necessary to increase the pressure in order to maintain the injection flow rate. In case of too high impairment or limited margin of pressure in the pumps, the injection flow rate may be decreased. As a result, the recovery of hydrocarbons is hindered.

Generally, in order to address polymer plugging and enhance the injectivity of the subterranean formation, oxidants such as hydrogen peroxide, sodium peroxide, chlorine dioxide and sodium hypochlorite have been employed in order to degrade the polymer. Nevertheless, these oxidants may not only corrode the injection line (and therefore be consumed before being actually injected) but they may also be consumed by organic compounds (such as residual oil for example) present in the injection stream. Therefore, larger amounts of oxidants might be needed for an optimized result. In addition, as sodium hydroxide is often used to stabilize oxidants such as sodium hypochlorite, precipitation of calcium carbonate and/or magnesium carbonate may occur in the presence of divalent cations such as calcium and magnesium in the injection stream. Alternatively, compounds such as persulfates or percarbonates may be used to degrade the polymer. However, these compounds are often in the form of powder form which makes their implementation on site more difficult. Furthermore, as such oxidants are poorly soluble, clogging of the injection well with undissolved powder presents a serious risk. Moreover, accumulation of such products in a dead zone of downhole safety organs such as the downhole safety valve (main equipment for blow out prevention) may be risky due to the high corroding power of these chemicals.

Document WO 2012/154785 relates to a method for controlling or arresting the rate of depolymerization of a polymer composition during a biocide treatment, and to the use of such method in oilfield and industrial applications. Furthermore, this document relates to a method for preparing a visco-stable application fluid containing a biocide, as well as additive compositions capable of reducing bacteria count in application fluids while maintaining the viscosity of such fluids.

Document US 2010/0204068 describes a method for controlling or arresting the rate of depolymerization of a polymer composition during a biocide treatment by controlling the pH of the composition and the use of such method in oilfield applications.

Document US 2017/0002259 relates to a well treatment fluid composition that includes a tetrakis (hydroxyorgano) phosphonium salt and at least one oxidizing viscosity breaker.

Document US 2015/0197686 describes a method which includes introducing a treatment fluid into a wellbore penetrating a subterranean formation. The treatment fluid contains a polymer gel comprising a water-soluble polymer, a biocidal agent such as chlorine dioxide in an amount sufficient to viscosify the treatment fluid, and an aqueous base fluid.

Document WO 2017/100160 relates to a well treatment biocide composition that includes a tetrakis(hydroxyorgano) phosphonium salt and 1,3-dimethoylol-5,5-dimethylhydantoin, in order to control the proliferation of undesired bacteria in oil and gas applications.

Document US 2011/0034352 relates to a composition and a method for tailoring the rheology of a fluid for use in the oil field services industry, including forming a fluid comprising a tetrakis(hydroxyalkyl)phosphonium salt and a polymer, and exposing the fluid to a temperature of about 20 to 200° C. The viscosity observed is at least 5% different than if no salt were present.

There is still a need for a method for enhancing the injectivity of an injection well, notably in case of polymer plugging, in an efficient and simple manner, without using large amounts of chemicals and without damaging the installations.

SUMMARY OF THE INVENTION

It is a first object of the invention to provide the use of at least one compound of formula (I):

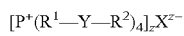

$$[P^+(R^1—Y—R^2)_4]_z X^{z-} \qquad (I)$$

wherein:

Y is chosen from an oxygen atom or an NH group;

$R^1$ is a linear or branched alkyl radical having from 1 to 15 carbon atoms;

$R^2$ is chosen from a hydrogen atom or a linear or branched alkyl radical having from 1 to 14 carbon atoms;

$X^{z-}$ is a monovalent anion or a divalent anion, or a trivalent anion, or a tetravalent anion group;

z is a number from 1 to 4;

for enhancing the injectivity of an injection well, wherein the compound of formula (I) is added to an aqueous medium to form an injection stream which is injected into a subterranean formation which comprises at least one polymer, via said injection well.

According to some embodiments, the monovalent anion is chosen from $F^-$, $Cl^-$, $Br^-$, $I^-$, $CH_3CO_2^-$ and $HCO_2^-$.

According to some embodiments, the divalent anion is chosen from $HOCH(CH_3)CO^{2-}$, $SO_4^{2-}$, $CO_3^{2-}$, and $HPO_3^{2-}$.

According to some embodiments, the trivalent anion is chosen from $PO_4^{3-}$, $BO_3^{3-}$, $C_3H_5O(CO_2)_3^{3-}$.

According to some embodiments, the tetravalent anion is $SiO_4^{4-}$.

According to some embodiments, Y is an oxygen atom.

According to some embodiments, $R^1$ is a linear alkyl radical having from 1 to 12 carbon atoms, preferably from 1 to 5 carbon atoms.

According to some embodiments, $R^2$ is a hydrogen atom.

According to some embodiments, the sum of carbon atoms in $R^1$ and in $R^2$ is equal to or less than 15, preferably equal to or less than 12, and more preferably equal to or less than 5.

According to some embodiments, z is 1 or 2.

According to some embodiments, the compound of formula (I) is a tetrakis(hydroxyalkyl)phosphonium salt, and preferably a tetrakis(hydroxymethyl)phosphonium salt.

According to some embodiments, the compound of formula (I) is chosen from tetrakis(hydroxymethyl)phosphonium sulfate, tetrakis(hydroxymethyl)phosphonium chloride, tetrakis(hydroxymethyl)phosphonium phosphate, tetrakis(hydroxymethyl)phosphonium bromide, tetrakis(hydroxymethyl)phosphonium carbonate, tetrakis(hydroxymethyl)phosphonium acetate, tetrakis(hydroxymethyl)phosphonium citrate, tetrakis(hydroxymethyl)phosphonium formate, tetrakis(hydroxymethyl)phosphonium lactate, tetrakis(hydroxymethyl)phosphonium borate, and tetrakis(hydroxymethyl)phosphonium silicate.

According to some embodiments, the compound of formula (I) is tetrakis(hydroxymethyl)phosphonium sulfate.

According to some embodiments, the total concentration of the compound of formula (I) in the injection stream is equal to or less than 5000 ppm, preferably equal to or less than 2000 ppm, and more preferably equal to or less than 1000 ppm, by weight.

According to some embodiments, the injectivity of the injection well is maintained or restored at a level of at least 50%, preferably, at least 70%, more preferably at least 80%, and even more preferably at least 90%, relative to the maximal injectivity of the injection well.

According to some embodiments, the injectivity of the injection well is increased by a factor of at least 1.5, preferably of at least 2, or of at least 3, or of at least 4, or at least 5, or at least 6, or at least 10, or at least 20, or at least 50, or at least 100 relative to the injectivity of the injection well before the compound of formula (I) is injected.

According to some embodiments, the polymer is chosen from polyacrylamide, polyacrylate, polyvinylpyrrolidone, poly(acrylic acid), poly(acrylamido-tert-butyl-sulfonic acid) and copolymers thereof.

According to some embodiments, the copolymer is chosen from a copolymer of acrylamide and acrylate, a copolymer of acrylamide and vinylpyrrolidone, a copolymer of acrylamide and acrylamido-tert-butyl-sulfonic acid, and a copolymer of acrylamide, acrylate and acrylamido-tert-butyl-sulfonic acid.

According to some embodiments, the injection stream has a salinity from 0 to 300 g/L.

According to some embodiments, the aqueous medium is chosen from produced water, fresh water, aquifer water and salt water.

According to some embodiments, the at least one compound of formula (I) is used in a polymer flooding process of oil recovery.

According to some embodiments, the injection stream is injected into the subterranean formation in a continuous manner.

According to some embodiments, the injection stream is injected into the subterranean formation in a discontinuous manner.

The present invention makes it possible to address the need expressed above. In particular, the invention provides a method for enhancing the injectivity of an injection well, notably in case of polymer plugging, in an efficient and simple manner, without using large amounts of chemicals and without damaging the installations.

This is achieved by the use of the compound of formula (I). More particularly, as the compound of formula (I) is a reducing agent, its injection into the injection well of a subterranean formation plugged by polymer, makes it possible to degrade the polymer by reducing its viscosity while at the same time avoiding corrosion of the installations or consumption by organic compounds present in the injection stream. In fact, in this case, the degradation of the polymer is more rapid than when oxidants of the prior art are used. Therefore, the injectivity of the injection well may be enhanced by using smaller amounts of the compound of formula (I) compared to the amounts of oxidants used in the prior art. Furthermore, as the compound of formula (I) is in a liquid form, the implementation of such compound on site is facilitated while at the same time the risk of clogging the injection well due to powder residues is avoided. Finally, the compound of formula (I) may be used in water comprising magnesium and/or calcium cations as the addition of sodium hydroxide is not necessary and therefore precipitation of carbonate salts does not occur.

The compound of formula (I) may be used in a curative manner, in order to enhance the injectivity of the injection well of a subterranean formation already clogged by polymer.

Alternatively, the compound of formula (I) may be used in a preventive manner (injectivity restoration before complete loss of well injectivity), in order to prevent polymer plugging of an injection well used for the injection of viscous polymer solutions which may provoke polymer plugging over time.

Figure 2:
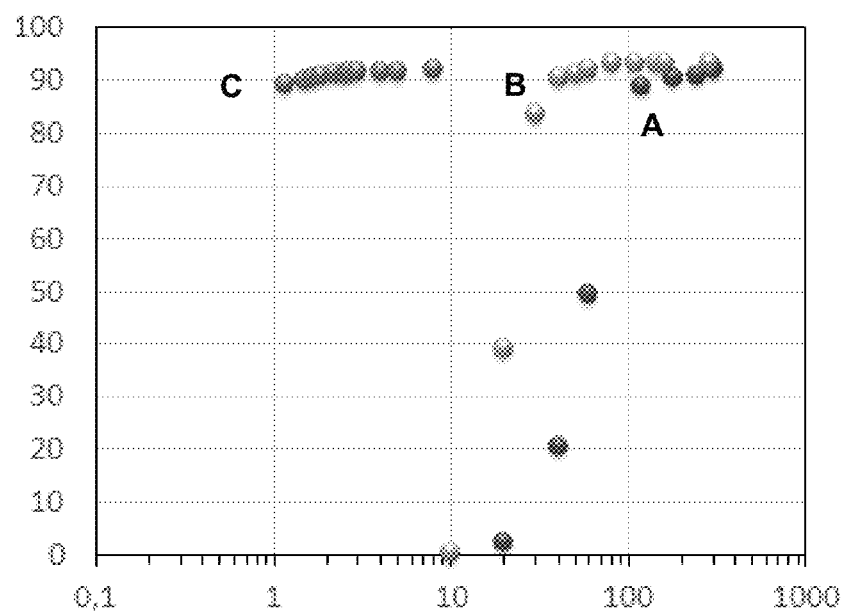

FIG. 2 shows the degradation of polymer over time when sodium persulfate (A), sodium hypochlorite (B) and THPS (C) are used. The degradation (%) can be read on the Y-axis and the time (minutes) can be read on the X-axis.

Figure 3:
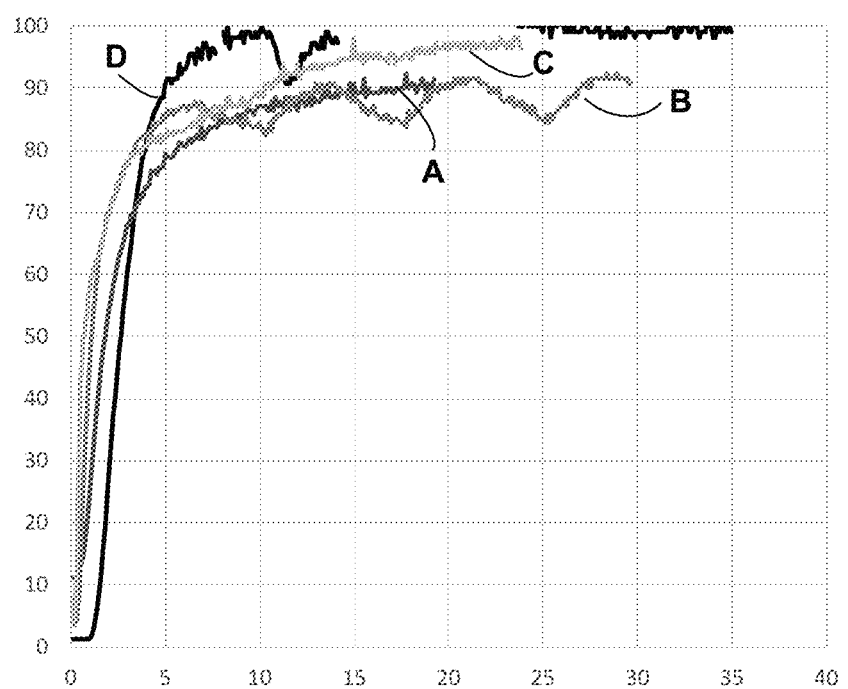

FIG. 3 shows the relative permeability of a porous medium over time when THPS (A, B, C) or sodium hypochlorite (D) are used to restore the permeability of a porous medium clogged by polymer residues. The relative permeability (%) can be read on the Y-axis and the time (minutes) can be read on the X-axis.

DESCRIPTION OF EMBODIMENTS

The invention will now be described in more detail without limitation in the following description.

Compound of Formula (I)

The invention relies on the use of at least one compound of formula (I):

$$[P^+(R^1-Y-R^2)_4]_zX^{z-} \qquad (I)$$

Y may represent an oxygen atom or an NH group. Preferably, Y represents an oxygen atom.

$R^1$ may be an alkyl radical having from 1 to 15 carbon atoms, preferably from 1 to 12 carbon atoms, more preferably from 1 to 5 carbon atoms and even more preferably from 1 to 3 carbon atoms. For example, $R^1$ may have from 1 to 3 carbon atoms; or from 3 to 6 carbon atoms; or from 6 to 9 carbon atoms; or from 9 to 12 carbon atoms; or from 12 to 15 carbon atoms.

$R^1$ may be a linear or branched alkyl radical. When $R^1$ is branched, it may have a degree of branching from 1 to 5. Preferably, $R^1$ is a linear alkyl radical.

$R^2$ may be a hydrogen atom. Alternatively, $R^2$ may be an alkyl radical having from 1 to 14 carbon atoms, preferably from 1 to 10 carbon atoms, and more preferably from 1 to 5 carbon atoms. For example, $R^2$ may have from 1 to 3 carbon atoms; or from 3 to 6 carbon atoms; or from 6 to 9 carbon atoms; or from 9 to 12 carbon atoms; or from 12 to 14 carbon atoms.

$R^2$ may be a linear or branched alkyl radical. When $R^1$ is branched, it may have a degree of branching from 1 to 5. Preferably, $R^2$ is a linear alkyl radical. More preferably $R^2$ is a hydrogen atom so that the compound of formula (I) comprises four hydroxy groups (—OH) or four free amine groups (—NH$_2$).

Preferably, the sum of carbon atoms in $R^1$ and $R^2$ is equal to or less than 15, preferably equal to or less than 12, and more preferably equal to or less than 5. For example, the sum of carbon atoms in $R^1$ and $R^2$ may be from 1 to 3; or from 3 to 6; or from 6 to 9; or from 9 to 12; or from 12 to 15.

$X^{z-}$ may be a monovalent anion, or a divalent anion, or a trivalent anion, or a tetravalent anion.

When $X^{z-}$ is a monovalent anion, it can be chosen from F$^-$, Cl$^-$, Br$^-$, I$^-$, an acetate group (CH$_3$CO$_2^-$) or a formate group (HCO$_2^-$).

Preferably, when $X^{z-}$ is a monovalent anion it is Cl$^-$.

When $X^{z-}$ is a divalent anion, it can be chosen from a sulfate group (SO$_4^{2-}$), a carbonate group (CO$_3^{2-}$), a lactate group (HOCH(CH$_3$)CO$_2^-$) or a phosphite group (HPO$_3^{2-}$). Preferably, when $X^{z-}$ is a divalent anion, it is a sulfate group.

When $X^{z-}$ is a trivalent anion, it can be chosen from a phosphonate group (PO$_4^{3-}$), a borate group (BO$_3^{3-}$) or a citrate group (C$_3$H$_5$O(CO$_2$)$_3^{3-}$).

When $X^{z-}$ is a tetravalent anion, it can be chosen from a silicate group (SiO$_4^{4-}$).

In formula (I), z may be a number from 1 to 4, and preferably 1 or 2. The number z corresponds to the charge of the anion.

According to some embodiments, the compound of formula (I) may be a tetrakis(hydroxyalkyl)phosphonium salt, and preferably a tetrakis(hydroxymethyl)phosphonium salt.

According to some embodiments, the compound of formula (I) may be chosen from tetrakis(hydroxymethyl)phosphonium sulfate, tetrakis(hydroxymethyl)phosphonium chloride, tetrakis(hydroxymethyl)phosphonium phosphate, tetrakis(hydroxymethyl)phosphonium bromide, tetrakis(hydroxymethyl)phosphonium carbonate, tetrakis(hydroxymethyl)phosphonium acetate, tetrakis(hydroxymethyl)phosphonium citrate, tetrakis(hydroxymethyl)phosphonium formate, tetrakis(hydroxymethyl)phosphonium lactate, tetrakis(hydroxymethyl)phosphonium borate, and tetrakis(hydroxymethyl)phosphonium silicate. More preferably, the compound of formula (I) is tetrakis(hydroxymethyl)phosphonium sulfate (THPS).

According to some embodiments, only one compound of formula (I) may be used. According to other embodiments, more than one compounds of formula (I) may be used for example two, or three or four compounds of formula (I) may be used in combination.

In case more than one compounds of formula (I) are used, at least one of them may be tetrakis(hydroxymethyl)phosphonium sulfate.

Hydrocarbon Recovery

According to the invention, hydrocarbons in gaseous and/or liquid phase are recovered from a subterranean formation. Preferably, hydrocarbon recovery includes oil recovery.

Therefore, the compound(s) of formula (I) is(are) added to an aqueous medium in order to form an injection stream. The aqueous medium used to form the injection stream may be or may derive from produced water, fresh water, sea water or aquifer water.

According to some embodiments, the injection stream may have a salinity from 0 to 300 g/L, and preferably from 0.1 to 270 g/L. For example, the aqueous solution may have a salinity from 0 to 5 g/L; or from 5 to 10 g/L; or from 10 to 15 g/L; or from 15 to 20 g/L; or from 20 to 25 g/L; or from 25 to 30 g/L; or from 30 to 35 g/L; or from 35 to 40 g/L; or from 40 to 45 g/L; or from 45 to 50 g/L; or from 50 to 55 g/L; or from 55 to 60 g/L; or from 60 to 65 g/L; or from 65 to 70 g/L; or from 70 to 75 g/L; or from 75 to 80 g/L; or from 80 to 85 g/L; or from 85 to 90 g/L; or from 90 to 95 g/L; or from 95 to 100 g/L; or from 100 to 110 g/L; or from 110 to 120 g/L; or from 120 to 130 g/L; or from 130 to 140 g/L; or from 140 to 150 g/L; or from 150 to 160 g/L; or from 160 to 170 g/L; or from 170 to 180 g/L; or from 180 to 190 g/L; or from 190 to 200 g/L; or from 200 to 210 g/L; or from 210 to 220 g/L; or from 220 to 230 g/L; or from 230 to 240 g/L; or from 240 to 250 g/L; or from 250 to 260 g/L; or from 260 to 270 g/L; or from 270 to 280 g/L; or from 280 to 290 g/L; or from 290 to 300 g/L.

Salinity is defined herein as the total concentration of dissolved inorganic salts in water, including e.g. NaCl, CaCl$_2$, MgCl$_2$ and any other inorganic salts.

The injection stream may comprise a total concentration of compound(s) of formula (I) equal to or less than 5000 ppm, preferably equal to or less than 2000 ppm, and more preferably equal to or less than 1000 ppm by weight. The total concentration of compound(s) of formula (I) may be for example from 5 to 25 ppm; or from 25 to 50 ppm; or from 50 to 100 ppm; or from 100 to 200 ppm; or from 200 to 300 ppm; or from 300 to 400 ppm; or from 400 to 500 ppm; or from 500 to 600 ppm; or from 600 to 700 ppm; or from 700 to 800 ppm; or from 800 to 900 ppm; or from 900 to 1000 ppm; or from 1100 to 1200 ppm; or from 1200 to 1300 ppm; or from 1300 to 1400 ppm; or from 1400 to 1500 ppm; or from 1500 to 1600 ppm; or from 1600 to 1700 ppm; or from 1700 to 1800 ppm; or from 1800 to 1900 ppm; or from 1900 to 2000 ppm by weight; or from 2000 ppm; or from 2100 to 2200 ppm; or from 2200 to 2300 ppm; or from 2300 to 2400 ppm; or from 2400 to 2500 ppm; or from 2500 to 2600 ppm; or from 2600 to 2700 ppm; or from 2700 to 2800 ppm; or from 2800 to 2900 ppm; or from 2900 to 3000 ppm by weight; 3000 ppm; or from 3100 to 3200 ppm; or from 3200 to 3300 ppm; or from 3300 to 3400 ppm; or from 3400 to 3500 ppm; or from 3500 to 3600 ppm; or from 3600 to 3700 ppm; or from 3700 to 3800 ppm; or from 3800 to 3900 ppm; or from 3900 to 4000 ppm by weight; 4000 ppm; or from 4100 to 4200 ppm; or from 4200 to 4300 ppm; or from 4300 to 4400 ppm; or from 4400 to 4500 ppm; or from 4500 to 4600 ppm; or from 4600 to 4700 ppm; or from 4700 to 4800 ppm; or from 4800 to 4900 ppm; or from 4900 to 5000 ppm by weight.

According to some embodiments, the injection stream may have a pH from 2.5 to 8.5, preferably from 3 to 7 and more preferably from 3.5 to 5.5. For example, the injection stream may have a pH from 2.5 to 3; or from 3 to 3.5; or from 3.5 to 4; or from 4 to 4.5; or from 4.5 to 5; or from 5 to 5.5; or from 5.5 to 6; or from 6 to 6.5; or from 6.5 to 7; or from 7 to 7.5; or from 7.5 to 8; or from 8 to 8.5.

According to some embodiments, the injection stream may comprise ions such as calcium and/or magnesium, mostly in the form of bicarbonates, sulfates and chlorides.

Therefore, the injection stream may comprise equal to or more than 0 ppm by weight of $Ca^{2+}$, preferably equal to or more than 5 ppm by weight of $Ca^{2+}$, more preferably equal to or more than 100 ppm by weight of $Ca^{2+}$, more preferably equal to or more than 120 ppm by weight of $Ca^{2+}$, more preferably equal to or more than 140 ppm by weight of $Ca^{2+}$, more preferably equal to or more than 180 ppm by weight of $Ca^{2+}$, more preferably equal to or more than 200 ppm by weight of $Ca^{2+}$, more preferably equal to or more than 500 ppm by weight of $Ca^{2+}$, more preferably equal to or more than 1000 ppm by weight of $Ca^{2+}$, more preferably equal to or more than 5000 ppm by weight of $Ca^{2+}$, and even more preferably equal to or more than 10000 ppm by weight of $Ca^{2+}$.

For example, the injection stream may comprise from 0 to 5 ppm; or from 5 to 50 ppm; or from 50 to 100 ppm; or from 100 to 500 ppm; or from 500 to 1000 ppm; or from 1000 to 5000 ppm; or from 5000 to 10000 ppm; or from 10000 to 20000 ppm; or from 20000 to 30000 ppm by weight of $Ca^{2+}$.

Furthermore, the injection stream may comprise equal to or more than 0 ppm by weight of $Mg^{2+}$, preferably equal to or more than 5 ppm by weight of $Mg^{2+}$, more preferably equal to or more than 100 ppm by weight of $Mg^{2+}$, more preferably equal to or more than 120 ppm by weight of $Mg^{2+}$, more preferably equal to or more than 140 ppm by weight of $Mg^{2+}$, more preferably equal to or more than 180 ppm by weight of $Mg^{2+}$, more preferably equal to or more than 200 ppm by weight of $Mg^{2+}$, more preferably equal to or more than 500 ppm by weight of $Mg^{2+}$, more preferably equal to or more than 1000 ppm by weight of $Mg^{2+}$, more preferably equal to or more than 5000 ppm by weight of $Mg^{2+}$, and even more preferably equal to or more than 10000 ppm by weight of $Mg^{2+}$.

For example, the injection stream may comprise from 0 to 5 ppm; or from 5 to 50 ppm; or from 50 to 100 ppm; or from 100 to 500 ppm; or from 500 to 1000 ppm; or from 1000 to 5000 ppm; or from 5000 to 10000 ppm; or from 10000 to 20000 ppm; or from 20000 to 30000 ppm by weight of $Mg^{2+}$.

The injection stream may further comprise additives such as surfactants, salts, sacrificial agents, mobility control polymers, pH adjustment agents, solvents and/or marking agents.

The injection stream may preferably be devoid of polymer.

The injection stream may then be injected into the injection well of a subterranean formation which comprises at least one polymer. Preferably, the injection well via which the injection stream is injected, is substantially plugged or clogged by at the least one polymer. More particularly, the openings of the injection well providing access to the subterranean formation may be substantially plugged or clogged by the polymer and/or the pores of the subterranean formation in contact with or in close proximity to the injection well may be substantially plugged or clogged by the polymer. Alternatively, the injection well via which the injection stream is injected, is prone to get plugged or clogged by the at least one polymer.

The temperature within the subterranean formation may range from 25 to 140° C., preferably from 30 to 140° C. and more preferably from 50 to 120° C.

The injection of the injection stream may be performed at a pressure from 10 to 1000 bar, preferably from 30 to 250 bar.

The permeability of at least a portion of the subterranean formation may range from 1 to 20000 md, preferably from 10 to 15000 md and more preferably from 10 to 5000 md, as estimated by well log.

The polymer present in the subterranean formation may be chosen from polyacrylamide, polyacrylate, polyvinylpyrrolidone, poly(acrylic acid), poly(acrylamido-tert-butyl-sulfonic acid) and copolymers thereof.

Such copolymers may be for example copolymers of acrylamide and acrylate, copolymers of acrylamide and vinylpyrrolidone, copolymers of acrylamide and acrylamido-tert-butyl-sulfonic acid, and copolymers of acrylamide, acrylate and acrylamido-tert-butyl-sulfonic acid.

Before, after and/or concomitantly with the injection of the injection stream in the subterranean formation, hydrocarbons may be recovered via one or more production wells.

According to some embodiments, a method for recovering hydrocarbons from a subterranean formation may comprise the successive steps of:
1) injecting a solution comprising a polymer into the subterranean formation via an injection well;
2) injecting the injection stream comprising the compound of formula (I) into the subterranean formation via the injection well, to enhance the injectivity of the injection well, as described elsewhere in the application;
3) injecting again the solution comprising a polymer into the subterranean formation via the injection well.

The recovery of hydrocarbons via the production well(s) may be carried out simultaneously with one or more than one of the above steps. For example, the recovery of hydrocarbons may be carried out simultaneously with step 1), and/or with step 2), and/or with step 3).

According to other embodiments, the method for recovering hydrocarbons from a subterranean formation may comprise the steps of:
1) injecting a solution comprising a polymer into the subterranean formation via an injection well;
2) injecting the injection stream comprising the compound of formula (I), into the subterranean formation via the injection well, to enhance the injectivity of the injection well, as described elsewhere in the application;
3) injecting a brine solution (devoid of polymer) into the subterranean formation via the injection well;

The recovery of hydrocarbons via the production well(s) may be carried out simultaneously with one or more than one of the above steps. For example, the recovery of hydrocarbons may be carried out simultaneously with step 1), and/or with step 2), and/or with step 3).

According to some embodiments, the recovery of hydrocarbons (after enhancing the injectivity of the well) is carried out in a water flooding process. In a waterflooding process, only water is injected into the subterranean formation.

According to other preferred embodiments, the recovery of hydrocarbons (after enhancing the injectivity of the well) is carried out in a polymer flooding process. In a polymer flooding process, water along with polymer are injected in the subterranean formation.

According to other preferred embodiments, the recovery of hydrocarbons (after enhancing the injectivity of the well) is carried out by using a surfactant, an alkali and/or a gas such as nitrogen, fuel gas or $CO_2$, in order to enhance the hydrocarbon recovery (other EOR techniques).

Enhancement of Injectivity

The invention affords an enhancement in the injectivity of the injection well through which the injection stream comprising the compound(s) of formula (I) is introduced.

The injectivity of an injection well is herein defined as the ratio of the flow rate of the stream which is injected via the injection well (which in this case is the injection stream) to the pressure drop between the bottom hole pressure and the reservoir pressure at a distance from the well.

The invention can be implemented in a preventive and/or curative manner, i.e. to prevent or reduce a decrease in injectivity which is possible or likely; and/or to increase injectivity further to a decrease in injectivity. By "prevent" is meant to restore the injectivity of the well before an extensive or full loss of injectivity is observed.

If several injection wells are used in the context of hydrocarbon production, the invention can be implemented in one or more of these injection wells, either simultaneously or at different points in time.

According to some embodiments, the invention may be implemented in a continuous manner, i.e. the injection stream comprising the compound(s) of formula (I) is continuously injected into the subterranean formation, for a period of time of at least 1 day, or at least 1 week, or at least 1 month, or at least 2 months, or at least 3 months, or at least 4 months, or at least 6 months, or at least 1 year, or at least 2 years, or at least 3 years.

According to other embodiments, the invention may be implemented in a discontinuous manner, i.e. the injection stream comprising the compound(s) of formula (I) is injected into the subterranean formation for a certain period of time, then the injection is stopped. In particular, the injection of the injection stream comprising the compound(s) of formula (I) into the subterranean formation may be repeated several times. For example, the injection of the injection stream comprising the compound(s) of formula (I) into the subterranean formation may be repeated every week, preferably every month, more preferably every semester or year or when needed. The injection of the injection stream comprising the compound(s) of formula (I) into the subterranean formation may notably have a duration from 2 hours to 1 day.

In some embodiments, the invention makes it possible to increase the injectivity of an injection well by a factor of at least 1.5, or at least 2, or at least 3, or at least 4, or at least 5, or at least 6, or at least 10, or at least 20, or at least 50, or at least 100.

In case of a preventive treatment, a factor between 2 and 5 may be targeted.

In case of a curative treatment, a factor between 5 and 100 may be targeted.

This factor of increase is defined as the ratio of the injectivity of the injection well at one point in time when the invention is implemented (i.e. when the injection stream comprises the compound(s) of formula (I)) relative to the injectivity of the injection well at one point in time before the invention is implemented (i.e. at a point in time when the injection stream does not yet comprise the compound(s) of formula (I)).

In some variations, this factor of increase is more precisely defined as the ratio of the time-averaged injectivity of the injection well when the invention is implemented, to the minimum injectivity of the injection well during the same period of time just before the invention is implemented.

In other variations, this factor of increase is more precisely defined as the ratio of the injectivity of the injection well one week after the start of the implementation of the invention, to the injectivity of the injection well one week before the start of the implementation of the invention.

In some embodiments, the invention makes it possible to maintain or restore the injectivity of the injection well at a level of at least 30%, or at least 40%, or at least 50%, or at least 60%, or at least 70%, or at least 80%, or at least 90%, or at least 95% relative to the maximal injectivity of the injection well which has been observed.

Usually, the maximal injectivity of an injection well is achieved at the beginning of polymer injection, before any clogging of the injection well has had a chance to occur.

EXAMPLES

The following examples illustrate the invention without limiting it.

Example 1—Measure of Viscosity Loss

A homogenous solution of polymer in brine was prepared. This solution had a salinity of 27 g/L and a polymer concentration of 1000 ppm by weight.

Firstly, in order to obtain a white reference, this solution was introduced into the measuring chamber of a viscosimeter (Brookfield DVI Prime) at ambient temperature (25° C.) and the viscosity curve was obtained from 5 to 100 rpm (equivalent to a shear rate range from 6 to 122 $s^{-1}$).

Then, two different solutions were prepared by adding tetrakis(hydroxymethyl)phosphonium sulfate (THPS) to the solution mentioned above, one containing 200 ppm by weight of THPS (A) and another containing 500 ppm by weight of THPS (B). These solutions were then introduced into the measuring chamber of the viscosimeter (Brookfield DVI Prime) at ambient temperature (25° C.) with a speed of 60 rpm which corresponds to a shear of 73 $s^{-1}$.

The measure of time started when THPS was added to the solution and prior to the introduction of the solution (comprising THPS) into the viscosimeter.

The viscosity at 60 rpm was then used to calculate the degradation of the polymer according to the following formula:

$$\text{Degradation (\%) at 25°C} = \frac{(\text{viscosity without } THPS(cP) - \text{viscosity with } THPS(cP))}{(\text{viscosity without } THPS(cP) - \text{viscosity of the brine } (cP))} \times 100$$

Figure 1:
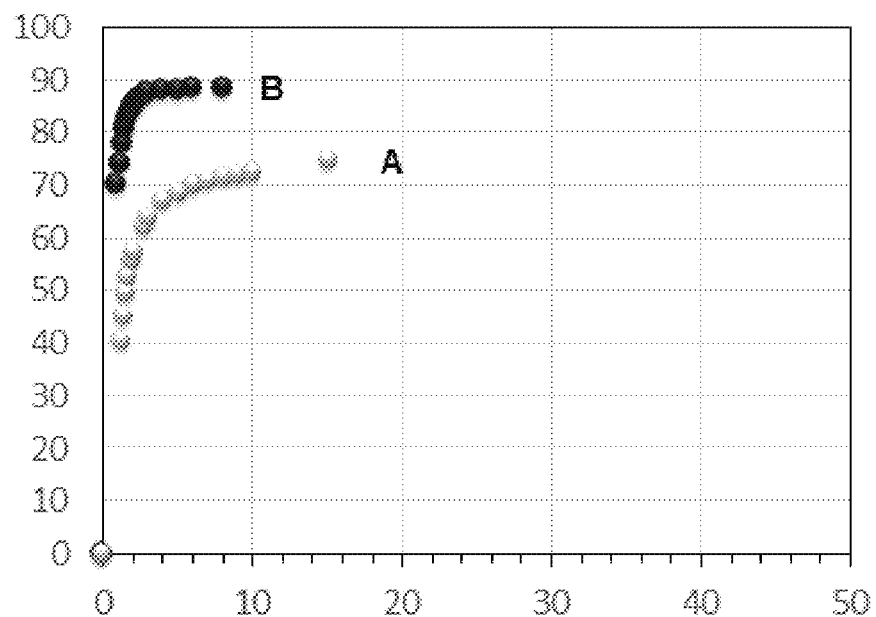
FIG. 1 shows the degradation of polymer over time when tetrakis(hydroxymethyl)phosphonium sulfate (THPS) at 200 ppm (A) and 500 ppm (B) is used. The degradation (%) can be read on the Y-axis and the time (minutes) can be read on the X-axis.

As illustrated in FIG. 1, the decrease in viscosity is rapid and stabilizes after a few minutes. The higher the concentration in THPS, the more the degradation of the polymer is important (more important degradation when 500 ppm (B) of THPS are used instead of 200 ppm (A)).

Example 2—Measure of Viscosity Loss

A homogenous solution of polymer in brine was prepared. This solution had a salinity of 27 g/L and a polymer concentration of 1000 ppm by weight.

Firstly, in order to obtain a white reference, this solution was introduced into the measuring chamber of a viscosimeter (Brookfield DVI Prime) at ambient temperature (25° C.) and the viscosity curve was obtained from 5 to 100 rpm.

Then, three solutions were prepared, each solution prepared by adding a specific compound into the solution described above. The first solution comprised 10000 ppm by weight of sodium persulfate (A), the second solution comprised 1000 ppm by weight of sodium hypochlorite (B) and the third solution comprised 500 ppm by weight of THPS (C).

Each solution was then introduced into the measuring chamber of the viscosimeter (Brookfield DVI Prime) at 25° C. for the solution comprising THPS, at 50° C. for the solution comprising sodium hypochlorite and at 65° C. for the solution comprising sodium persulfate, with a speed of 60 rpm which corresponds to a shear of 73 s$^{-1}$.

The measure of time started when each specific compound was added to the solution and prior to the introduction of the solution (comprising the specific compound) into the viscosimeter.

The viscosity at 60 rpm was then used to calculate the degradation of the polymer according to the following formula:

$$\text{Degradation (\%)} = \frac{(\text{viscosity without specific compound } (cP) - \text{viscosity with specific compound } (cP))}{(\text{viscosity without specific compound } (cP) - \text{viscosity of the brine } (cP))} \times 100$$

As illustrated in FIG. 2, the degradation of the polymer when using THPS (C) is more rapid than the degradation of the polymer when sodium persulfate (A) or sodium hypochlorite (B) were used. Furthermore, as shown in FIG. 2, lower amounts of THPS compared to the amounts of sodium persulfate and sodium hypochlorite were used to achieve the same (or even better) result in polymer degradation.

Example 3—Injection Enhancement

During this experiment, a syringe pump, a small reactor (300 ml), an oven and a sintered door were used. A ceramic frit was used as porous medium. (permeability of 2 Darcy and 41% porosity) to mimic the injection in a hydrocarbon reservoir.

10 liters of a brine solution at a salinity of 6 g/L (with 0.2 g/L NaN$_3$) comprising Na$_2$SO$_4$ (0.0075 g), KCl (0.1105 g), CaCl$_2$.2H$_2$O (0.7445 g), MgCl$_2$.6H$_2$O (0.5605 g) and NaCl (4.727 g) were prepared. This brine solution was passed through the porous medium, in order to measure the permeability of the porous medium in the oven at 60° C. (k$_i$=initial permeability). The pressure drop through the frit was measured at constant flow rate. After pressure stabilization, the flow rate was varied and the pressure at stabilization measured. By applying the Darcy law:

$$DP = Eta(Q)/(kS)L$$

(with DP=pressure drop, Eta=water viscosity, k=permeability, S=surface area of the porous medium inlet, L=length of the porous medium), the intrinsic permeability Q to water was measured.

Then, preformed polymer particles (consisting in a crosslinked polymer microgel swollen by water) was added in the brine solution to form a polymer solution. This polymer was chosen as it can generate small gel particles which do not dissolve and plug porous medium inlet. This polymer solution was passed through the porous medium by a syringe pump comprising two syringes under a pressure of 2 bar and with a constant flow rate of 50 mL/h (the low flow rate makes it possible to make sure that the aggregates accumulate on the frit) so that the polymer solution (100 mL) may achieve fouling of the porous medium.

The relative permeability (k/k$_i$ (%)) was measured at 500 mL/h and 92 to 99% of the injectivity was lost (relative permeability of 8 to 1%).

Then, four solutions (A to D) were prepared, each solution prepared by adding to the brine solution mentioned above a specific concentration of THPS or sodium hypochlorite.

| Solution A | 500 ppm of THPS |
| Solution B | 1000 ppm of THPS |
| Solution C | 2000 ppm of THPS |
| Solution D | 1000 ppm of sodium hypochlorite |

The solution comprising THPS or sodium hypochlorite was then passed through the porous medium with a flow rate of 500 mL/h until stabilization of the pressure decrease which means that antifouling has taken place and is stable. The relative permeability was again measured (k/k$_i$ (%)) at 500 mL/h for each solution as illustrated in FIG. 3 and the table below. 90% of the initial injectivity was recovered for solutions A and B, 95% of the initial injectivity was recovered for solution C and 100% of the initial injectivity was recovered for solution D.

| Solution | k/ki (%) | Final k/ki (%) |
| --- | --- | --- |
| A | 11.2 | 91.5 |
| B | 3.5 | 90.7 |
| C | 4 | 96.4 |
| D | 1.3 | 100 |

Therefore, as illustrated in FIG. 3, the injection of a solution comprising THPS in the porous medium may lead to good results in terms of restoration of injectivity which are similar to the results obtained when a solution comprising sodium hypochlorite is injected to the porous medium.

The invention claimed is:

1. A method of treating an injection well, comprising: adding at least one compound of formula (I):

[P⁺(R¹—Y—R²)₄]₂X^{z−}    (I)

wherein:
Y is chosen from an oxygen atom or an NH group;
R¹ is a linear or branched alkyl radical having from 1 to 15 carbon atoms;
R² is chosen from a hydrogen atom or a linear or branched alkyl radical having from 1 to 14 carbon atoms;
$X^{z-}$ is a monovalent anion or a divalent anion, or a trivalent anion, or a tetravalent anion group;
z is a number from 1 to 4;
to an aqueous medium to form an injection stream;
injecting the injection stream into a subterranean formation which comprises at least one polymer, via the injection well, the subterranean formation comprising the at least one polymer prior to the injection of the injection stream,
enhancing the injectivity of the injection well by degrading the at least one polymer;
wherein the injection stream is devoid of polymer, and
the method further comprises maintaining or restoring the injectivity of the injection well at a level of at least 50% relative to a maximal injectivity of the injection well.

2. The method of claim 1, wherein $X^{z-}$ is the monovalent anion and is chosen from $F^-$, $Cl^-$, $Br^-$, $I^-$, $CH_3CO_2^-$ and $HCO_2^-$ or wherein $X^{z-}$ is the divalent anion and is chosen from $HOCH(CH_3)CO^{2-}$, $SO_4^{2-}$, $CO_3^{2-}$, and $HPO_3^{2-}$.

3. The method of claim 1, wherein $X^{z-}$ is the trivalent anion and is chosen from $PO_4^{3-}$, $BO_3^{3-}$, $C_3H_5O(CO_2)_3^{3-}$, or wherein $X^{z-}$ is the tetravalent anion and is $SiO_4^{4-}$.

4. The method of claim 1, wherein Y is the oxygen atom.

5. The method of claim 1, wherein R¹ is a linear alkyl radical having from 1 to 12 carbon atoms.

6. The method of claim 1, wherein R² is the hydrogen atom.

7. The method of claim 1, wherein the sum of carbon atoms in R¹ and in R² is equal to or less than 15.

8. The method of claim 1, wherein z is 1 or 2.

9. The method of claim 1, wherein the compound of formula (I) is a tetrakis(hydroxyalkyl)phosphonium salt.

10. The method of claim 1, wherein the compound of formula (I) is chosen from tetrakis(hydroxymethyl)phosphonium sulfate, tetrakis(hydroxymethyl)phosphonium chloride, tetrakis(hydroxymethyl)phosphonium phosphate, tetrakis(hydroxymethyl)phosphonium bromide, tetrakis(hydroxymethyl)phosphonium carbonate, tetrakis(hydroxymethyl)phosphonium acetate, tetrakis(hydroxymethyl)phosphonium citrate, tetrakis(hydroxymethyl)phosphonium formate, tetrakis(hydroxymethyl)phosphonium lactate, tetrakis(hydroxymethyl)phosphonium borate, and tetrakis(hydroxymethyl)phosphonium silicate.

11. The method of claim 1, wherein the compound of formula (I) is tetrakis(hydroxymethyl)phosphonium sulfate.

12. The method of claim 1, wherein the total concentration of the compound of formula (I) in the injection stream is equal to or less than 5000 ppm by weight.

13. The method of claim 1, comprising increasing the injectivity of the injection well by a factor between 1.5 and 100 relative to the injectivity of the injection well before the compound of formula (I) is injected.

14. The method of claim 1, wherein the polymer is chosen from polyacrylamide, polyacrylate, polyvinylpyrrolidone, poly(acrylic acid), poly(acrylamido-tert-butyl-sulfonic acid) and copolymers comprising two or more selected from acrylamide, acrylate, vinylpyrrolidone, acrylic acid, and acrylamido-tert-butyl-sulfonic acid.

15. The method of claim 14, wherein the polymer is the copolymer and is chosen from a copolymer of acrylamide and acrylate, a copolymer of acrylamide and vinylpyrrolidone, a copolymer of acrylamide and acrylamido-tert-butyl-sulfonic acid, and a copolymer of acrylamide, acrylate and acrylamido-tert-butyl-sulfonic acid.

16. The method of claim 1, wherein the injection stream has a salinity from 0 to 300 g/L.

17. The method of claim 1, wherein the aqueous medium is chosen from produced water, fresh water, aquifer water and salt water.

18. The method of claim 1, which is implemented in a polymer flooding process of oil recovery.

19. The method of claim 1, comprising injecting the injection stream into the subterranean formation in a continuous manner, or in a discontinuous manner.

* * * * *